United States Patent
Hofmann et al.

[11] Patent Number: 5,573,464
[45] Date of Patent: Nov. 12, 1996

[54] TRIPOD JOINT WITH A PROJECTION OR BEAD FOR SECURING A ROLLER ASSEMBLY TO A RESPECTIVE ARM

[75] Inventors: Norbert Hofmann, Ronneburg; Michael Ricks, Bad Vilbel, both of Germany

[73] Assignee: Löhr & Bromkamp GmbH, Offenbach am Main, Germany

[21] Appl. No.: 292,075

[22] Filed: Aug. 17, 1994

[30] Foreign Application Priority Data

Aug. 17, 1993 [DE] Germany .......................... 43 27 606.7

[51] Int. Cl.⁶ .................................................. F16D 3/205
[52] U.S. Cl. ........................ 464/111; 464/123; 464/905
[58] Field of Search .............................. 464/111, 120, 464/122, 123, 124, 132, 905

[56] References Cited

U.S. PATENT DOCUMENTS

| | | | |
|---|---|---|---|
| 1,881,326 | 10/1932 | Peters | 464/132 X |
| 4,747,803 | 5/1988 | Kimata et al. | |
| 4,854,917 | 8/1989 | Mizukoshi | 464/905 X |
| 4,886,479 | 12/1989 | Richtmeyer et al. | |
| 5,184,977 | 2/1993 | Girguis | 464/111 |
| 5,199,925 | 4/1993 | Welschof | 464/122 X |

FOREIGN PATENT DOCUMENTS

| | | | |
|---|---|---|---|
| 2474120 | 7/1981 | France . | |
| 2608701 | 6/1988 | France . | |
| 3936600 | 5/1991 | Germany . | |
| 4130963 | 4/1993 | Germany . | |
| 4327036A1 | 2/1995 | Germany . | |
| 2226102 | 6/1990 | United Kingdom | 464/111 |

*Primary Examiner*—Daniel P. Stodola
*Assistant Examiner*—Eileen A. Dunn
*Attorney, Agent, or Firm*—Harness, Dickey & Pierce

[57] ABSTRACT

A tripod joint has an outer joint part with three axially extending recesses and an inner joint part with three radially circumferentially distributed arms, each engaging one of the longitudinal recesses. Roller assemblies, with roller carriers and roller elements, are carried on the arms. A mechanism cooperating with the inner joint part provides a form-fitting resistance to prevent the roller assemblies from axial removal from their respective arm.

6 Claims, 5 Drawing Sheets

PRIOR ART

Fig. 1

PRIOR ART

TRIPOD JOINT WITH A PROJECTION OR BEAD FOR SECURING A ROLLER ASSEMBLY TO A RESPECTIVE ARM

BACKGROUND OF THE INVENTION

The invention relates to a tripod joint which includes three circumferentially distributed axis-parallel recesses forming circumferentially opposed tracks. The joint also includes an inner joint part with a star-shaped cross-section and three circumferentially distributed arms which engage the recesses of an outer joint part. The arms support roller assemblies, each including a roller carrier assembly and a roller, with the latter arranged on the arm to be longitudinally and angularly movable relative to the arm axis and pivotable relative to the arm axis.

The above definition covers a number of different prior art tripod joints. The solutions in accordance with the invention preferably refer to the first embodiment mentioned below, but analogously they are applicable to all three types of referred to embodiment.

In a first embodiment, each arm includes a part-spherical arm end on which a roller carrier with a cylindrical inner aperture is held so as to be axially movable relative to the arm axis and pivotable relative to the arm axis. A roller is rotatably held on each roller carrier, with preferably a needle bearing arranged between each roller carrier and roller.

In a second embodiment, each cylindrical arm includes an inner ring with an internally cylindrical surface which is guided so as to be axially movable relative to the arm axis. The inner ring includes a spherical outer face which engages an at least part-spherical inner face of a roller carrier which is held on the inner ring so as to be pivotable relative to the arm axis. A roller is rotatably held on each roller carrier, with preferably a needle bearing arranged between each roller carrier and roller.

Finally, in a third embodiment an internally cylindrical inner ring, with an outer spherical face, is rotatably held on each cylindrical arm. A roller, with an internally cylindrical face, is guided on the inner ring so as to be displaceable relative to the arm axis and pivotable relative to the arm axis. Preferably, a needle bearing is arranged between each arm and inner ring.

In the case of all embodiments mentioned, the roller assemblies, with their circumferentially undivided rollers, have to be slid radially on to the arm before it is possible for the inner joint parts with the slide-on roller assemblies to be introduced axially into the recesses in the outer joint part. For design reasons, the roller assemblies do not have a fixed position on the arms, to meet the required kinematic conditions, neither in the axial direction nor with reference to their angular position. This complicates manual assembly and does not permit an automatic assembly. In particular, when an inner joint part with slide-on roller assemblies and an outer joint part with horizontally positioned axes are to be inserted into one another, there is a risk of the roller assemblies pivoting on the tripod arms and thus they cannot be introduced into the recesses in the outer joint part, or they simply fall off the tripod arm as a result of their weight.

SUMMARY OF THE INVENTION

It is therefore the object of the present invention to provide an improved tripod joint which assembly procedures are facilitated and, especially, may be assembled automatically.

The solution is characterised by means which cooperate with the inner joint part and which provide a form-fitting resistance to prevent a roller assembly from axial removal from the respective arm. The holding force of the resistance plus the friction forces are greater than the force of the weight of a roller assembly, thereby eliminating the risk of the roller assembly falling off the respective arm. Due in particular to a multi-point contact between the roller assemblies and the means, it is possible to ensure, for assembly purposes, the roller assemblies are accurately aligned on the arms to permit them to be slid into the recesses of the outer joint part. Thus, the roller axes are aligned coaxially relative to the arm axes and held in a defined axial position. A number of different embodiments of the means in accordance with the invention will be described below.

A first solution refers to a tripod joint with cylindrical inner recesses in the roller carriers and arms with spherical arm ends. Here the radially inwardly directed edge of the inner recess of each roller carrier is provided with elastically deformable projections. The projections may be guided past the respective arm end without being destroyed and provide a form-fitting resistance to prevent a roller assembly from axial removal from the respective arm. The holding force of the projections plus the friction force is greater than the weight of the roller assembly. The projections may be formed out of the roller carrier material, especially by upsetting or pressing in the inner edge of the internally cylindrical recess, for example in three circumferentially distributed regions. The elasticity of the projections is such, that under an axial force, the roller assemblies may be guided alongside the arms and fitted on the arm ends, with the axial force calculated such that the roller assemblies are prevented from automatically falling out of the assembled position.

A second solution refers to a tripod joint with cylindrical inner recesses in the roller carriers and with arms having spherical arm ends. Here the radially inwardly directed edge of the inner recess of the roller carrier is provided with projections which may be guided past the spherical arm end in a predetermined angular position only and which, after the angular position has been changed, provide a form-fitting resistance to prevent a roller assembly from axial removal from the respective arm. The projections may be produced in the same way as described in connection with the above-mentioned solution. However, in this case, the projections do not have to be elastically deformable. Instead, the outer circumference of the spherical arm ends may be provided with circumferentially distributed axial grooves for passing through the projections for assembly purposes. After the roller carrier has been rotated, the roller assembly is secured against sliding away from the arm.

In the case of both mentioned solutions, the projections may also be produced separately from the roller carrier. The projections may be glued on or connected by a holding ring or they may be pressed into the inner recess of the roller carrier.

According to a third solution, which again refers to a tripod joint with cylindrical inner recesses in the roller carrier and arms with spherical arm ends, it proposes providing resilient holding elements which may engage recesses in the roller carrier and establish contact on the radial inside and radial outside relative to the spherical arm end and which provide a form-fitting resistance to prevent a roller assembly from axial removal from the respective arm. Holding elements of this type are also suitable to ensure that, for assembly purposes, the roller assemblies are held in a coaxial position on the arm without adversely affecting joint operation at a later stage. On the outside, the holding elements may be plate-shaped or they may be non-round, deformed spring rings or spring wires. On the inside, on the arm base, the holding elements may be suitable discs which radially expand when slid over the spherical arm ends or non-round spring rings or spring wires which are outwardly pushed away.

In a fourth solution, which may be applied to joints with purely cylindrical arms according to the second embodiment, resilient holding elements are provided which may engage recesses in the roller carrier and in the respective spherical arm end. The elements provide a form-fitting resistance to prevent a roller assembly from axial removal from the respective arm. In this case, too, the elasticity of the holding elements should be such that the pivoting movement of the roller assemblies on the arm and axial displacement along the arm axes should not be adversely affected in operation. On the other hand, the stiffness of the holding elements is high enough to coaxially align and fix the roller assemblies on the arms, even under the influence of weight forces.

In a first embodiment of the present invention, a plate-shaped elastomer member with reference to the joint axis, engages the roller carrier on its radial outside and the outside of the-respective arm.

A second embodiment of this the present invention includes a helical spring which, with reference to the joint axis, engages the roller carrier on its radial inside and the base of the respective arm. The free inner diameter of the helical spring has to be greater than that of the arm and its elasticity has to be such that it can be slid over the spherical arm end for example.

A further solution which may be applied to all tripod joint types mentioned initially, includes the three roller assemblies provided with a common holding element which is secured to the center and end face of the star-shaped inner joint part. The holding element includes three circumferentially distributed apertures or recesses, with the roller assemblies insertable into, and engageable, in the apertures and recesses which form a form-fitting resistance to prevent a roller assembly from axial removal from the respective arm.

The common holding element, in a first embodiment, may include a planar disc made of plate metal, plastics or even cardboard, with simple apertures punched out for the central part of the inner joint part, e.g. the tripod, and for the three roller assemblies fitted thereon. In an improved embodiment, the holding element is deformed three-dimensionally and includes, for example, indentations for the three roller assemblies which prevent the rollers removal from the roller carriers and the roller assemblies removal from the arms.

After the inner joint part with its roller assemblies has been introduced into the outer joint part, the holding element is usually axially withdrawn from the inner joint part. Thus, it constitutes an assembly aid for temporary use.

However, according to a preferred embodiment, the holding element may be integral with, and directly formed onto, a convoluted boot of an elastic material and which, after the above-described assembly procedure for the inner joint part with the rollers positioned thereon and the outer joint part, is connected directly to the outer joint part and remains on the joint carrying out its normal boot function. In this case, too, it is only during the assembly process that the roller assemblies remain in the respective recesses in the convoluted boot.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention will be described below with reference to the drawing wherein:

FIG. 10b is a sectional view of along line 10b—10b of FIG. 10a.

DETAILED DESCRIPTION OF THE PREFERRED EMBODIMENTS

Figure 1:
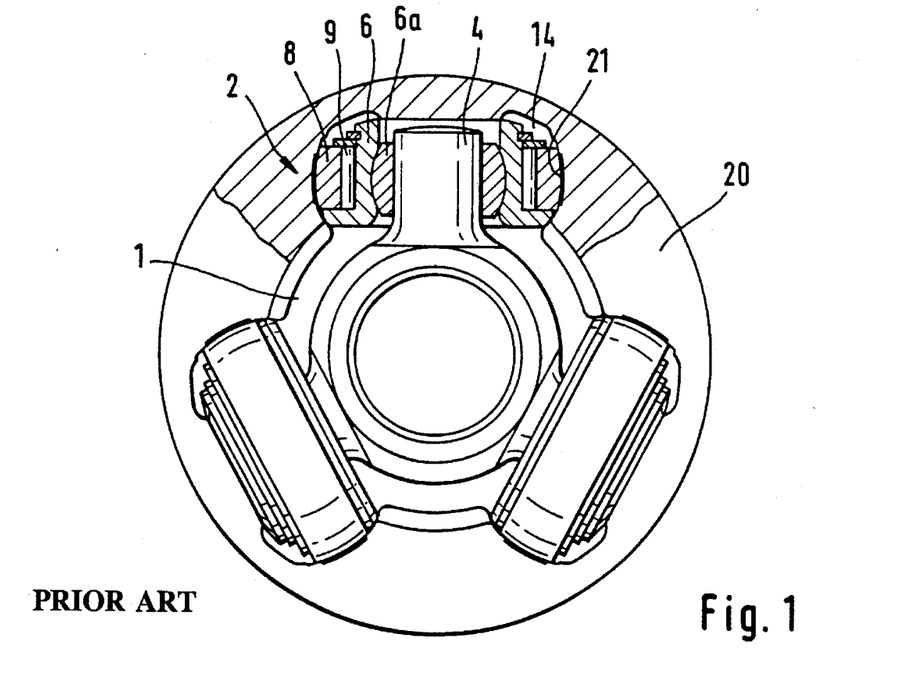
FIG. 1 is a partial cross sectional view of a first type of a joint of the species in accordance with the state of the art.

FIG. 1 shows a substantially annular inner joint part 1 with circumferentially distributed radial cylindrical arms 4 as well as an outer joint part 20 with circumferentially distributed recesses. The arms 4 engage the recesses. The arms support roller assemblies 2, one of which is shown in section. The roller assemblies include an inner ring 6a with an internally cylindrical inner face and a spherical outer face. The inner ring 6a is able to oscillate axially with reference to the arm axis of the arm 4. On the inner ring 6a there is held a roller carrier 6 which, by means of an internally spherical recess, is pivotably positioned on the spherical outer face of the inner ring 6a. A roller 8 is rotatably held on the roller carrier 6 by means of a needle bearing 9. The externally spherical roller 8 runs on tracks 21 in the recess 14.

Figure 2:
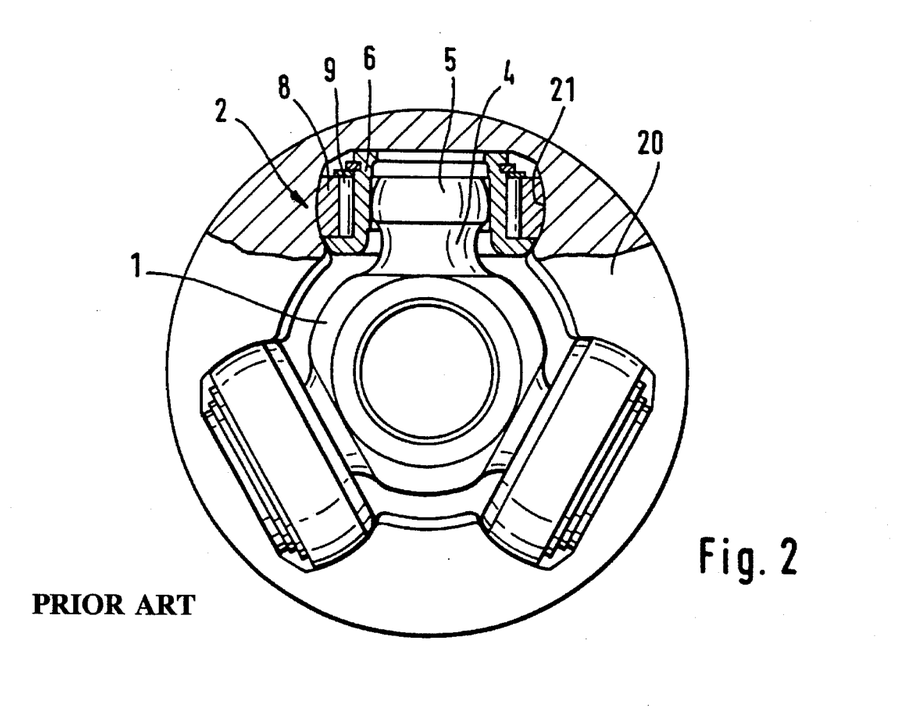
FIG. 2 is a partial cross sectional view of a second type of a joint of the species according to the state of the art.

FIG. 2 shows a substantially annular inner joint part 1 with radially adjoining circumferentially distributed arms 4 having spherical arm ends 5. The inner joint part is inserted into an outer joint part 20 with circumferentially distributed recesses. Between the arms and recess roller assemblies 2 are provided, one of which is shown in section and with each including a roller carrier 6 which has an internally cylindrical inner aperture by means of which it is held on the arm 4 so as to be pivotable relative to the arm axis. A roller 8 is held on the roller carrier 6 by means of a needle bearing 9. The inner recess includes internally cylindrical tracks 21.

Figures 3, 3C:
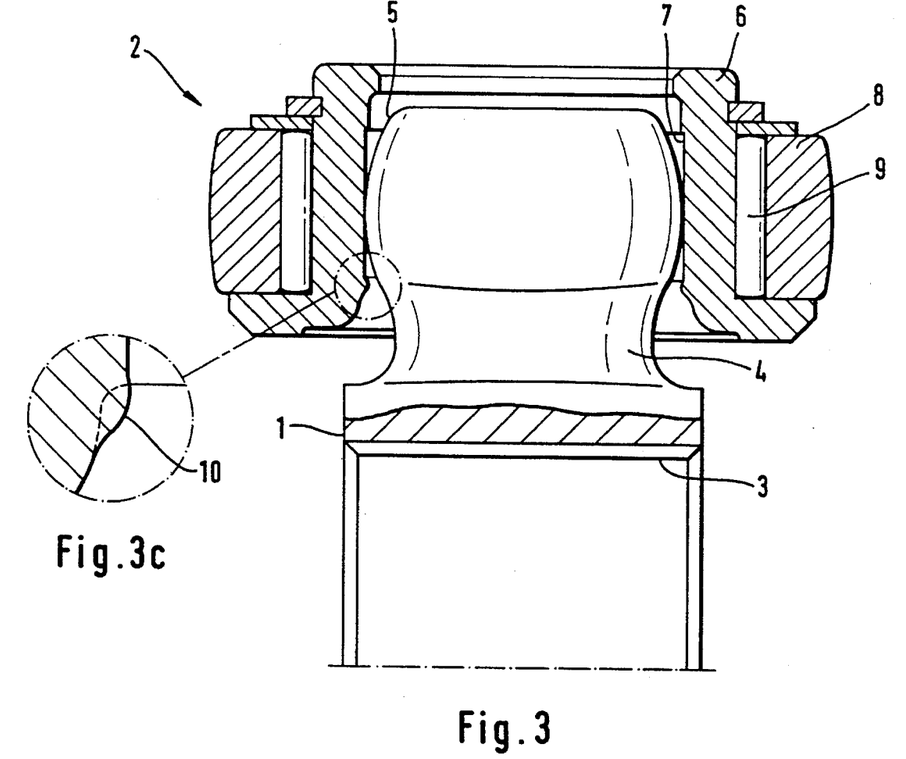
FIG. 3 is a cross sectional view of a roller assembly, in accordance with the invention, on a tripod joint having an internally cylindrical recess in the roller carrier and having a spherical arm end.
FIG. 3c is an enlarged detail view of a first embodiment of an individual projection.

FIG. 3 is half a longitudinal section through an inner joint part 1 of a tripod joint with a roller assembly 2. The inner joint part 1 is shown to include a longitudinal recess 3 to receive a shaft and a tripod arm 4 with a spherical arm end 5. The roller assembly 2 includes a roller carrier 6 with a largely cylindrical inner recess 7 which cooperates with the spherical arm end 5. A roller 8 is rotatably supported on the roller carrier 6 by means of a needle bearing 9. As illustrated in the detail in FIG. 3c, the radially inwardly directed edge of the inner recess 7 includes elastically deformable projections 10 which permit the roller carrier 6 to be slid on to the spherical arm end 5, but they prevent the roller assembly 2 from sliding off the spherical arm end due to the influence of its own weight. The projections 10 may be pressed out of the material or they may be applied subsequently to the inside of the roller carrier 6 by being glued, pressed in or pressed on. Their height amounts to 2$\frac{3}{10}$ mm.

Figure 3A:
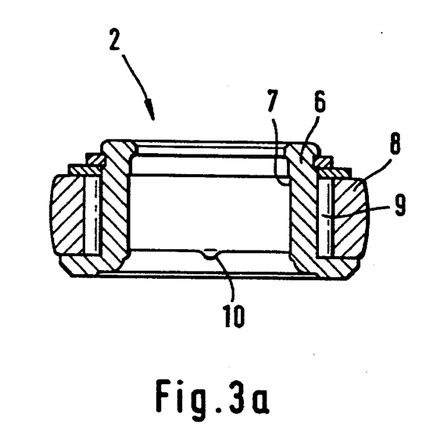
FIG. 3a is a cross sectional detail view of a roller assembly in accordance with the invention and according to FIG. 3.

FIG. 3a shows the same details as FIG. 3, with identical reference numbers. It can be seen that the inner recess 7 of the roller carrier 6 is provided with a total of four circumferentially distributed projections 10.

Figure 3B:
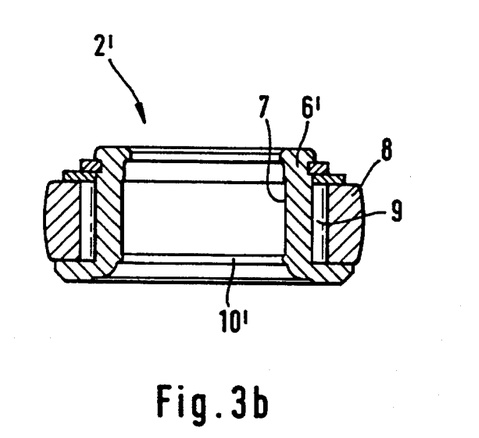
FIG. 3b is a cross sectional detail view of a roller assembly with an annular edge.

FIG. 3b shows the same details as FIG. 3, with identical reference numbers. FIG. 3b deviates from FIG. 3 in that the lower edge of the inner recess 7 of the roller carrier 6' of the roller assembly 2' is provided with a continuous annular bead 10'.

Figure 4:
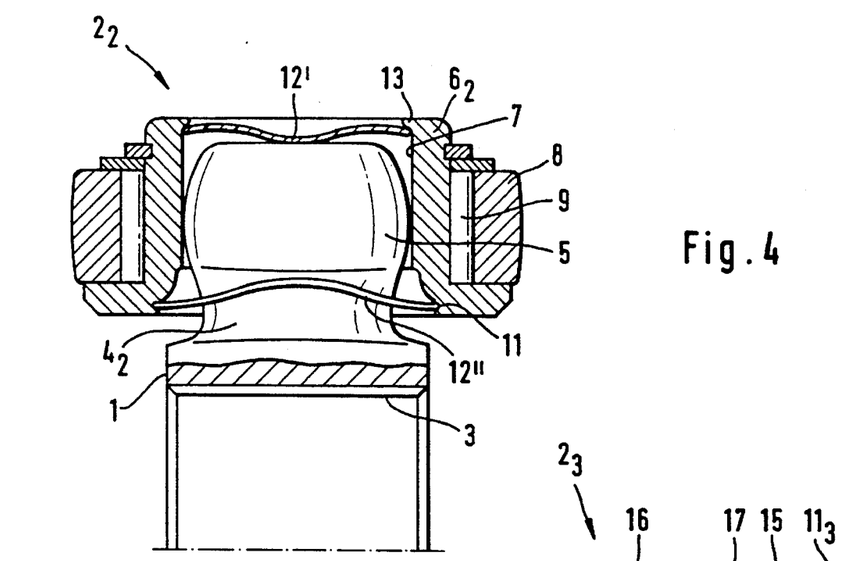
FIG. 4 is a cross sectional view of a roller assembly, in accordance with the invention, on a tripod joint having internally cylindrical recesses in the roller carrier and having a spherical arm end, it includes a second embodiment including resilient discs.
Figures 5, 6:
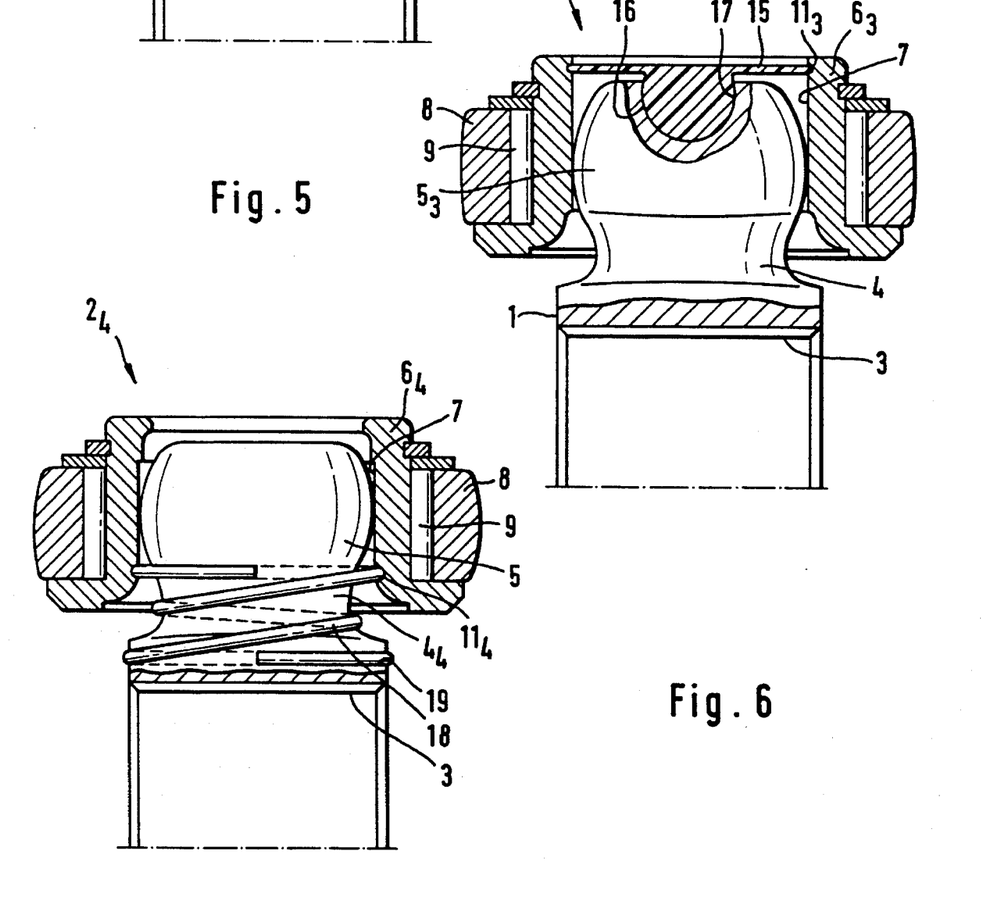
FIG. 5 is a cross sectional view of a roller assembly, in accordance with the invention, on a tripod joint with an internally cylindrical recess in the roller carrier and having a spherical arm end, it is a third embodiment including a resilient member.
FIG. 6 is a cross sectional view of a roller assembly, in accordance with the invention, on a tripod joint with an internally cylindrical recess in the roller carrier and having a spherical arm end, it is a fourth embodiment including a supporting spring.

In FIGS. 4 to 6, any details corresponding to those shown in FIG. 3 have been given the same reference numbers; if different, they are provided with suitable indices.

In FIG. 4, the inner recess 7 of the roller carrier $6_2$ does not include any projections. Instead, its lower edge includes a groove 11 into which there are inserted resilient spring mean 12' which are supported from below on the spherical arm end 5. They may consist of parallel spring wires or non-round spring rings for example. Furthermore, second resilient spring means 12 supported on the surface of the spherical arm end 5 are inserted into the inner aperture 7 behind an upper collar 13. The spring means, too, may include parallel spring wires or non-round spring rings. Other embodiments (not illustrated) may be disc members, at least with a central aperture, which, on the inside and outside, may include resilient edges or tongues.

In FIG. 5, the inner aperture 7 of the roller carrier $6_3$, at the upper end, is provided with a groove $11_3$. A resilient annular disc 15 is inserted in groove $11_3$. The disc includes an indentation 16 directed towards the spherical arm end $5_3$ and which is form-fittingly inserted into a calotte 17 in the spherical arm end $5_3$.

In FIG. 6, a roller carrier $6_4$, again, at its lower end directed towards the tripod $1_4$, is provided with a groove $11_4$ into which there is inserted a resilient helical spring 18 which, in addition, engages a groove 19 at the base of the arm $4_4$.

Figure 7:
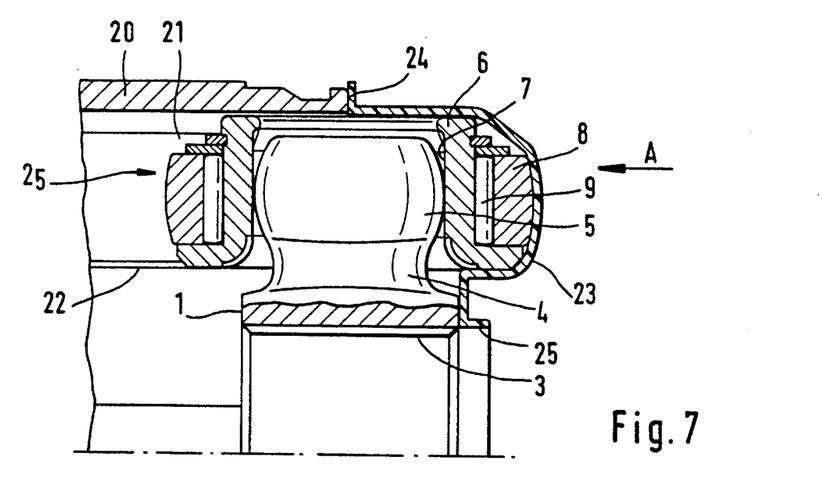
FIG. 7 is a cross sectional view of a roller assembly, in accordance with the invention, on a tripod joint with an internally cylindrical recess in the roller carrier and having a spherical arm end, it is a fifth embodiment, with the outer joint part being illustrated in a broken-away section at the open end of a longitudinal recess into which half the roller assembly as shown has been inserted, a holding element is also identifiable.

FIG. 7 shows an inner joint part 1 with a roller assembly $2_5$ which, apart from not including any projections, corresponds with the embodiment as illustrated in FIG. 1 with respect to all details. Half of the inner joint part 1 with its fitted roller assembly $2_5$ has already been introduced into an outer joint part 20 whose tracks 21 for the rollers 8 and supporting shoulders 22 for the roller carrier 6 are also indicated. Half of the roller assembly $2_5$ is embraced by a dish-shaped indentation 26 of an annular holding element 23 which, by means of its outer edge 24, is axially supported relative to the outer joint part 20 and which, by means of its inner edge 25, can easily be centered relative to a shaft plugged into the inner joint part 1. It is important for three circumferentially distributed roller assemblies $2_5$ to be held in a fixed symmetric position relative to one another when they are introduced into the holding element 23 so that they can be introduced simultaneously and in a problem-free way into the tracks 21. A centered position of the inner joint part 1 relative to the roller assemblies occurs for reasons of symmetry.

Figure 8:
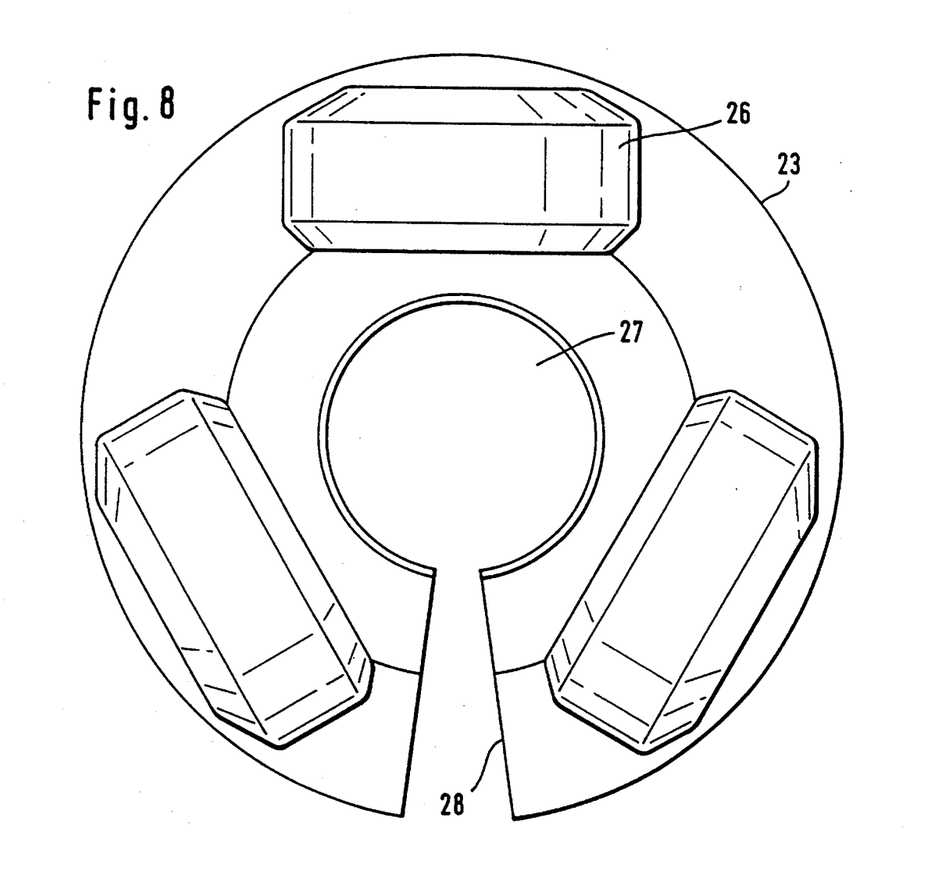
FIG. 8 is an axial view through a holding element according to FIG. 7.

FIG. 8 shows the holding element 23 according to FIG. 7 which, in addition to three indentations or punched out regions 26 for the roller assemblies, it includes a central aperture 27 which is centered on a shaft connected to, and inserted into, the inner joint part 1. A radial slot 28, which starts from the aperture 27, provides means by which the holding element 23 may be fitted on the shaft and removed therefrom even in those cases where it is impossible to slide on the holding element axially.

Figure 9:
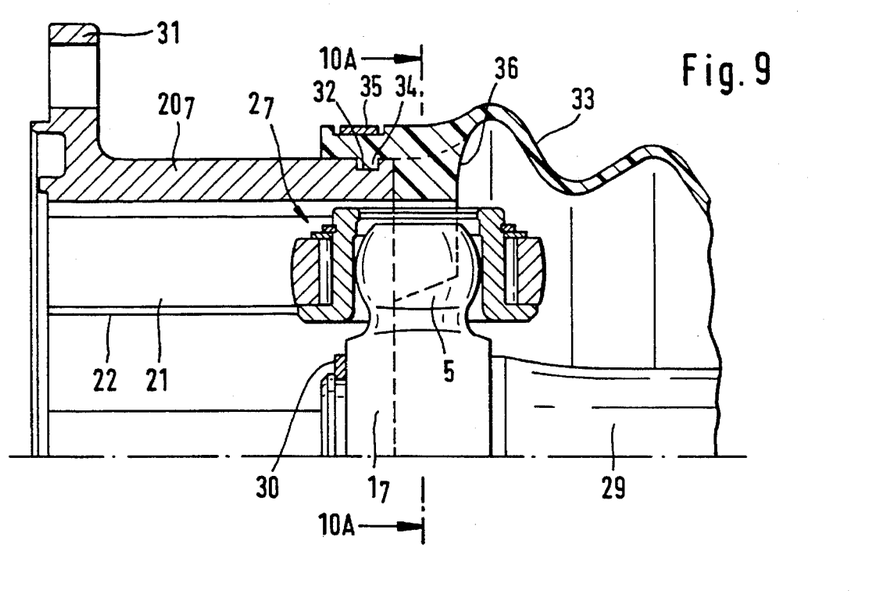
FIG. 9 is a cross sectional view of a roller assembly, in accordance with the invention, on a tripod joint with an internally cylindrical recess in the roller carrier and having a spherical arm end, it is a sixth embodiment with the outer joint part also shown in section; half the roller assembly has been inserted into the outer joint part, and a holding element in the form of a convoluted boot is also shown in a position where it is ready to be fitted in the outer joint part.

FIG. 9 shows an inner joint part $1_7$ into which a driveshaft 29 is inserted and secured by a securing ring 30. The roller assembly $2_7$ corresponds to that shown in FIG. 7 in respect of all details. Again, nearly half of this roller assembly with the respective inner joint part is introduced into an outer joint part $20_7$ which again is provided with tracks 21 and supporting shoulders 22 for the roller carrier 6. The outer joint part $20_7$ is illustrated as far as its end and includes a connecting flange 31. At the opposite end, its outer circumference is provided with a groove 32 engaged by a convoluted boot 33 with an inner annular bead 34.

In this region, the boot is secured by a tensioning strip 35. As a special feature, the boot includes an inner projection 36 which is engaged by the roller assembly $2_7$ and which holds it in a slightly resilient way. Because of the symmetric shape of the boot, in this case, too, the three roller assemblies $2_7$ may be secured relative to one another by the holding means 36. The inner point part $1_7$, again, for reasons of symmetry, is centered automatically.

Figure 10A:
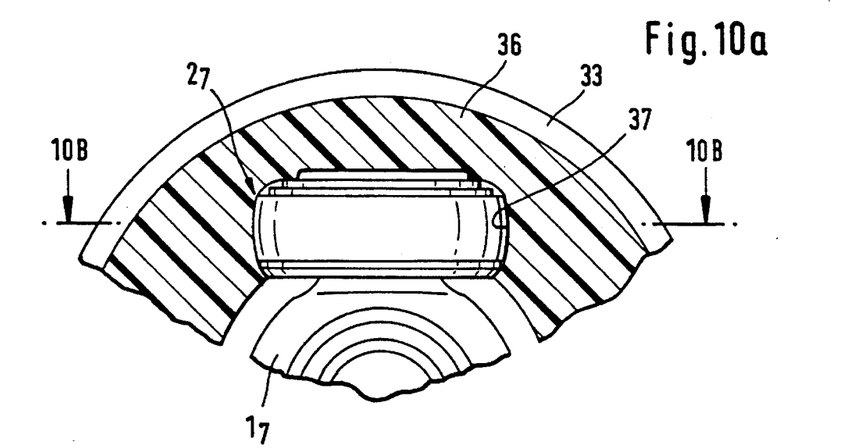
FIG. 10a is a sectional view along line 10a—10a of FIG. 9.

FIG. 10a is a cross-section through the convoluted boot 33 having the projection according to FIG. 9, which comprises inner recesses 37 for form-fittingly inserting the roller assembly $2_7$ shown in outline only. As the boot is inserted axially, the roller assemblies may be threaded simultaneously into the tracks 21, and subsequently, the inner joint part $1_7$ is inserted fully into the outer joint part.

Figure 10B:
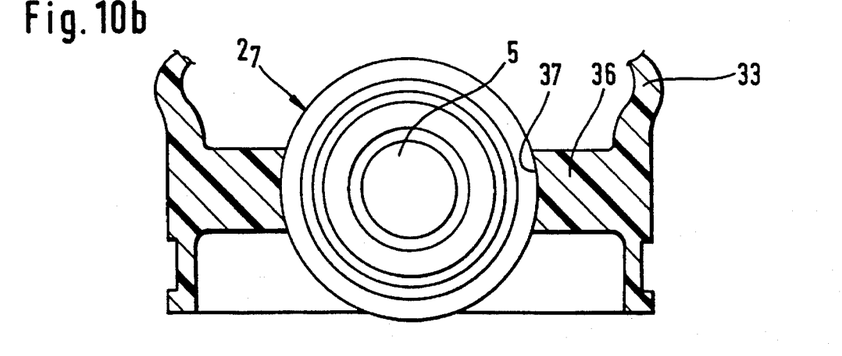

FIG. 10b is a tangential sectional view through the boot 33 having the projection 36 according to FIG. 10a. FIG. 10b shows that the inner recess 37 includes concave surfaces which allow the roller assembly $2_7$ to resiliently engage the projection 36.

While the above detailed description describes the preferred embodiment of the present invention, the invention is susceptible to modification, variation, and alteration without deviating from the scope and fair meaning of the subjoined claims.

We claim:

1. A tripod joint comprising:

an outer joint part provided with three axially extending longitudinal recesses with circumferentially opposed tracks;

an inner joint part with three radial circumferentially distributed arms which each engage one of the longitudinal recesses and carry roller assemblies each including a roller carrier and a roller element, said roller elements rollingly guided in the axial direction in the longitudinal recesses of the outer joint part on the tracks, with each roller carrier provided with a cylindrical inner recess and guided on a spherical arm end of a respective one of said arms so as to be pivotable and longitudinally movable relative to an axis of the respective arm, said roller element rotatably supported on the roller carrier, and said roller assemblies each including the roller carriers and the roller elements being supported on the outer joint part to prevent the roller assemblies from tilting around the longitudinal axis of the inner joint part; and having a radially inwardly directed edge of the inner recess of each roller carrier including at least one elastically deformable projection or an elastic deformable bead said projection or bead may be guided past the respective arm end in being elastically deformed without being destroyed, wherein said projection or bead provides a form-fitting resistance to prevent said roller assembly from axial removal from its respective arm.

2. A tripod joint according to claim 1, wherein the projections are formed on or formed so as to be intergral with the roller carrier.

3. A tripod joint according to claim 1, wherein the projections are attached to the roller carrier, especially glued on, pressed in or pressed on.

4. A tripod joint comprising:

an outer joint part with three axially extending longitudinal recesses with circumferentially opposed tracks;

an inner joint part with three radial circumferentially distributed arms which each engage one of the longitudinal recesses and carry roller assemblies each including a roller carrier and a roller element, said roller element rollingly guided in the axial direction in the longitudinal recesses of the outer joint part on tracks, each roller carrier including a cylindrical inner recess and guided on a respective one of said arms with a spherical arm end so as to be pivotable and longitudinally movable relative to an axis of the respective arm, said roller element rotatably supported on the roller carrier, and said roller assemblies each including the roller carrier and the roller element being supported on the outer joint part to prevent the roller assemblies from tilting around the longitudinal axis of the inner joint part; and having a radially inwardly directed edge of the inner recess of the roller carrier including at least one projection or bead which may be guided past the respective arm end in a predetermined angular position only without being destroyed and which, after the angular position has been changed, said projection or bead providing a form-fitting resistance to prevent said roller assembly from axial removal from its respective arm.

5. A tripod joint according to claim 4, wherein the projections are formed on or formed so as to be integral with the roller carrier.

6. A tripod joint according to claim 4, wherein the projections are attached to the roller carrier, especially glued on, pressed in or pressed on.

* * * * *

UNITED STATES PATENT AND TRADEMARK OFFICE
CERTIFICATE OF CORRECTION

PATENT NO. : 5,573,464
DATED : November 12, 1996
INVENTOR(S) : Norbert Hofmann and Michael Ricks It is certified that error appears in the above-indentified patent and that said Letters Patent is hereby corrected as shown below:

Column 3, line 25, before "respective" delete the hyphen     Column 3, line 26, delete "this"

Column 4, line 60, delete "of" (first occurrence)

Column 5, line 56, "mean" should be --means--

Column 5, line 59, "12" should be --12''--

Column 6, line 57, "point" should be --joint--

Column 8, line 13, Claim 4, before "tracks", insert --the--

Signed and Sealed this

Fifteenth Day of April, 1997

Attest:

BRUCE LEHMAN

*Attesting Officer*      *Commissioner of Patents and Trademarks*